(12) United States Patent
Penner

(10) Patent No.: US 8,287,021 B2
(45) Date of Patent: Oct. 16, 2012

(54) VEHICLE HANDLE ASSEMBLIES INCLUDING ANTI-PINCH FEATURES

(75) Inventor: Benjamin Warren Penner, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 588 days.

(21) Appl. No.: 12/544,514

(22) Filed: Aug. 20, 2009

(65) Prior Publication Data

US 2011/0042972 A1 Feb. 24, 2011

(51) Int. Cl.
*B60R 13/00* (2006.01)

(52) U.S. Cl. .................. 296/24.34; 296/37.8; 292/336.3

(58) Field of Classification Search .............. 296/24.34, 296/37.8, 37.12; 292/336.3
See application file for complete search history.

(56) References Cited

U.S. PATENT DOCUMENTS

| | | | |
|---|---|---|---|
| 4,834,433 A * | 5/1989 | Keller | 292/336.3 |
| 5,725,262 A | 3/1998 | Kritzler | |
| 6,234,548 B1 | 5/2001 | Mittelbach et al. | |
| 6,736,438 B1 * | 5/2004 | Wieclawski | 296/24.3 |
| 6,883,852 B2 * | 4/2005 | Laskey | 296/37.8 |
| 6,971,667 B2 * | 12/2005 | Enders et al. | 280/730.1 |
| 7,070,016 B1 | 7/2006 | Tucker | |
| 7,273,239 B1 | 9/2007 | Hauber | |
| 7,390,036 B2 | 6/2008 | Marrs et al. | |
| 7,469,503 B2 | 12/2008 | Wesson et al. | |
| 2006/0207817 A1 | 9/2006 | Tucker et al. | |
| 2007/0290513 A1 | 12/2007 | Hauber | |
| 2008/0079279 A1 * | 4/2008 | Spykerman et al. | 296/24.34 |
| 2010/0090428 A1 * | 4/2010 | Meers et al. | 280/47.26 |

* cited by examiner

*Primary Examiner* — Lori Lyjak
(74) *Attorney, Agent, or Firm* — Dinsmore & Shohl LLP

(57) ABSTRACT

A vehicle interior handle assembly includes a handle comprising a front wall and a back wall. The front wall and back wall define a downwardly open pocket sized to receive one or more of an operator's fingers for a pulling operation to move the handle between latch and unlatch positions. A panel is adjacent the handle. The panel has a portion located behind the pocket with the handle in the latch position and a portion below the pocket with the handle in the latch position. The panel has an outer surface facing the handle having a contour such that a distance from the outer surface of the panel to an end of the back wall of the handle is maintained at less than a maximum distance as the handle is moved from the latch position to the unlatch position the maximum distance selected to prevent placement of a finger between the outer surface and the end of the back wall of the handle.

19 Claims, 13 Drawing Sheets

VEHICLE HANDLE ASSEMBLIES INCLUDING ANTI-PINCH FEATURES

TECHNICAL FIELD

The present specification generally relates to vehicle handle assemblies and, more specifically, to vehicle handle assemblies including anti-pinch features.

BACKGROUND

Vehicles often include various handles for use in operating a number of vehicle components. Some of the handles maybe located on the vehicles' exteriors, such as door handles and trunk handles. Alternatively, some of the handles may be located on the interior of vehicle, such as interior door handles and handles for use in unlatching hoods or releasing parking brakes.

In some instances, handles located in the interiors of the vehicles are connected to latching mechanisms via cables, for example, due to the remoteness of the handles from the latching mechanisms. Thus, cables and other components of the handles may tend to interfere with placement of an operator's fingers when actuating the handles. In some cases, the operator may be vulnerable to pinching during actuation of the handles. Thus, it is desirable to provide handles with anti-pinching features to reduce an operator's vulnerability to pinching.

SUMMARY

In one embodiment, a vehicle interior handle assembly includes a handle comprising a front wall and a back wall. The front wall and back wall define a downwardly open pocket sized to receive one or more of an operator's fingers for a pulling operation to move the handle between latch and unlatch positions. A panel is adjacent the handle. The panel has a portion located behind the pocket with the handle in the latch position and a portion below the pocket with the handle in the latch position. The panel has an outer surface facing the handle having a contour such that a distance from the outer surface of the panel to an end of the back wall of the handle is maintained at less than a maximum distance as the handle is moved from the latch position to the unlatch position the maximum distance selected to prevent placement of a finger between the outer surface and the end of the back wall of the handle.

In another embodiment, a vehicle console assembly includes a handle assembly located at a rear of the console. The handle assembly includes a handle comprising a front wall and a back wall. The front wall and back wall define a downwardly open pocket sized to receive one or more of an operator's fingers for a pulling operation to move the handle between latch and unlatch positions. A panel is adjacent the handle. The panel has an outer surface facing the handle. The outer surface is shaped to maintain a maximum distance or less from the outer surface to an end of the back wall of the handle as the handle is moved from the latch position to the unlatch position.

In another embodiment, a vehicle console assembly includes a housing comprising one or more panels including a rear panel. A handle includes a front wall and a back wall. The front wall and back wall define a downwardly open pocket sized to receive one or more of an operator's fingers for a pulling operation to move the handle between latch and unlatch positions relative to the rear panel. An end of the back wall of the handle traces a curved path as the handle is moved from the latch position to the unlatch position. The panel is curved such that the curvature of the panel below the end of the back wall follows the curvature of the curved path to control a distance between the end of the back wall and the panel as the handle is moved.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to vehicle handle assemblies, which generally include a handle that is moveable between open and closed positions relative to a panel structure to which the handle is mounted. As described below, the handle assembly may be located on a center console assembly within an interior of a vehicle, or may be located elsewhere, such as on an instrument panel. The handle and panel structure may include one or more anti-pinch features that can reduce a likelihood that an operator of the handle will pinch or otherwise catch his or her finger or other object when operating the handle. Various embodiments of the vehicle handle assemblies and the operation of the vehicle handle assemblies will be described in more detail herein.

Figure 1:
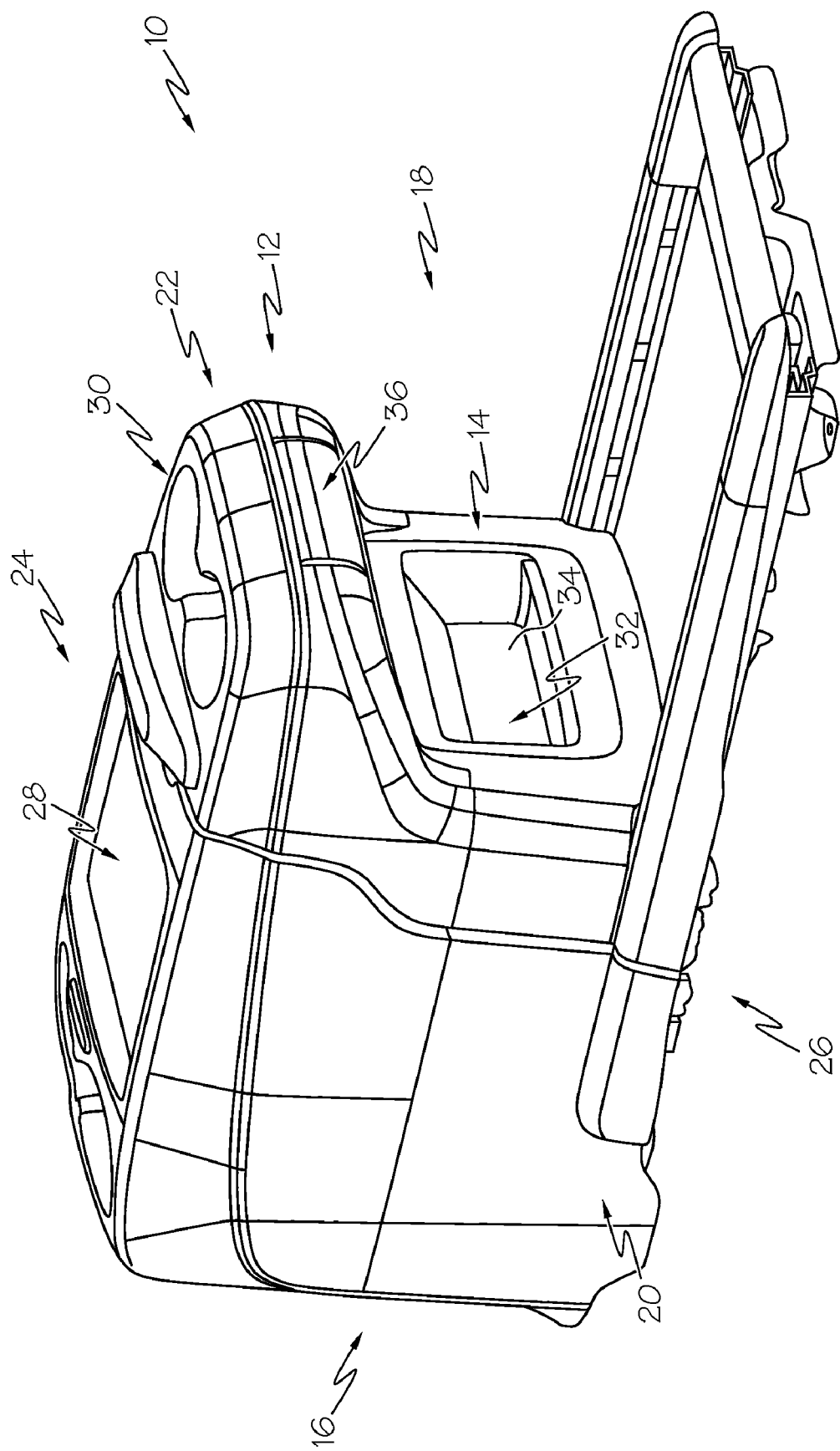
FIG. 1 is a perspective side view of a console assembly according to one or more embodiments shown and described herein.

Referring to FIG. 1, an exemplary embodiment of a center console assembly 10 includes a handle assembly 12 located at a rear 18 of the console assembly 10. The center console assembly includes one or more panel structures (e.g., see panel structure 14) that together form a front 16 that faces a front of the vehicle, the rear 18 that faces a rear of the vehicle, opposite sides 20 and 22 that extend from the front 16 to the rear 18, a top 24 that faces a roof of the vehicle and a bottom 26 that faces a floor of the vehicle. The console assembly 10 may be located, for example, between front seats of the vehicle. Other locations for the console assembly 10 are possible, such as between rear seats of the vehicle. The console assembly 10 may include a number of features, such as a storage compartment 28, cup holders 30 and a rear panel 32 providing a pocket 34. Various other features may be provided, such as vehicle controls, for example, to adjust side view mirrors, air conditioning controls, seat positioning controls, sound system controls, etc.

The handle assembly 12 includes a handle 36 and the panel structure 14. In the illustrated embodiment, the handle 36 and the panel structure 14 are located at the rear 18 of the console assembly 10. While the handle assembly 12 is illustrated at the rear 18 of the console assembly 10, the handle assembly 12 may be located elsewhere in the vehicle such as on an instrument panel, e.g., under the steering wheel, on the front, sides or top of the console assembly 10, etc. The location of the handle 36 at the rear 18 of the console assembly 10 may provide rear passengers access to the handle 36. Front occupants of the vehicle may also be able to access the handle assembly 12 located at the rear 18 of the console assembly 10.

Figure 2:
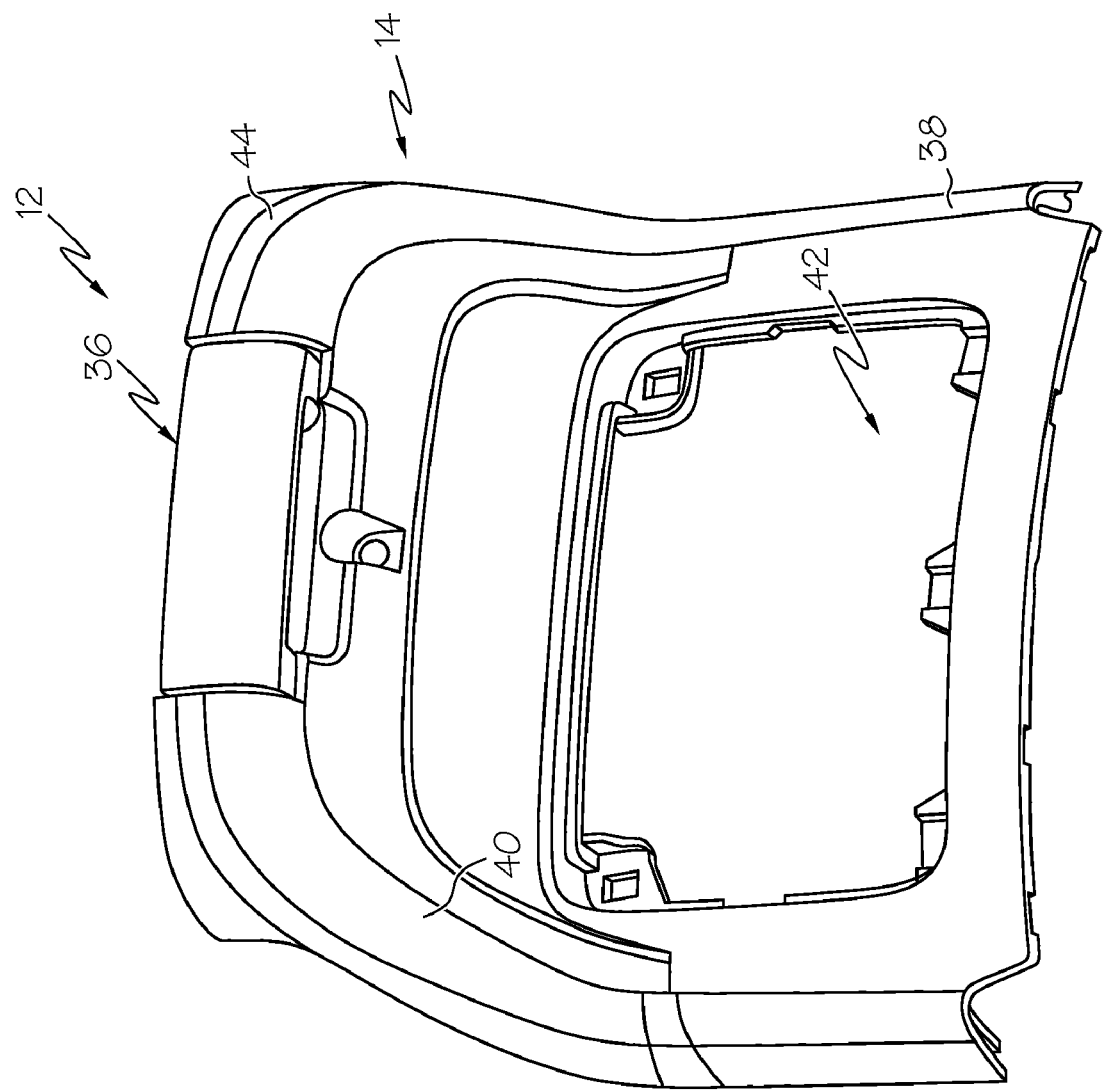
FIG. 2 is a perspective view of a rear panel for use with the console assembly of FIG. 1 including an embodiment of a handle assembly according to one or more embodiments shown and described herein.

Referring now to FIG. 2, the handle assembly 12 including the panel structure 14 and the handle 36 are shown in isolation. The panel structure 14 includes a lower, vertical portion 38 that is connected to an upper, relatively horizontal portion 40. The lower portion 38 includes a panel opening 42, which may be closed by the panel 32. The upper portion 40 overhangs the panel opening 42 and terminates at a rearward facing end 44.

Figure 3:
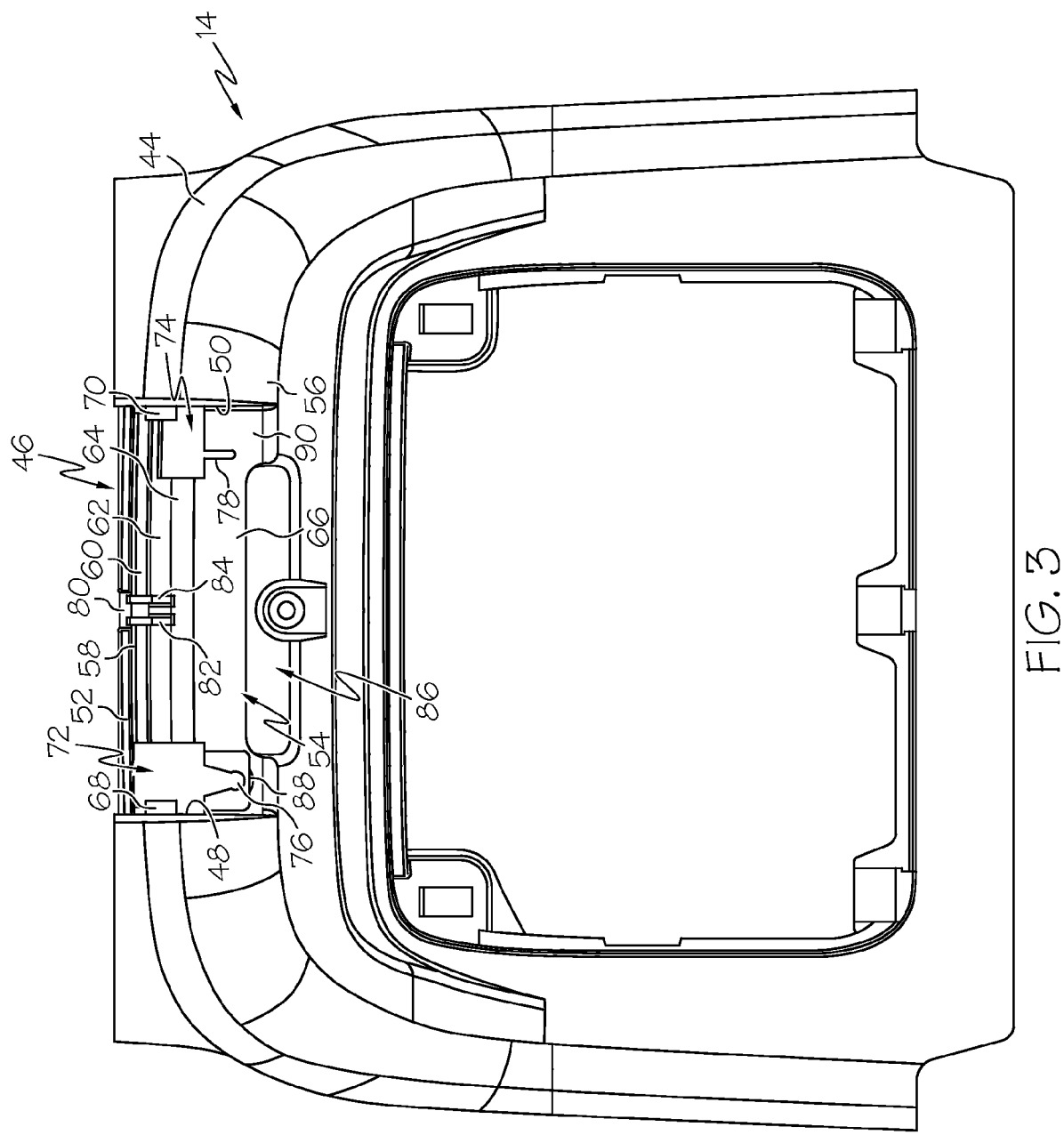
FIG. 3 is a frontward view of the rear panel of FIG. 2 with a handle removed according to one or more embodiments shown and described herein.
Figure 4:
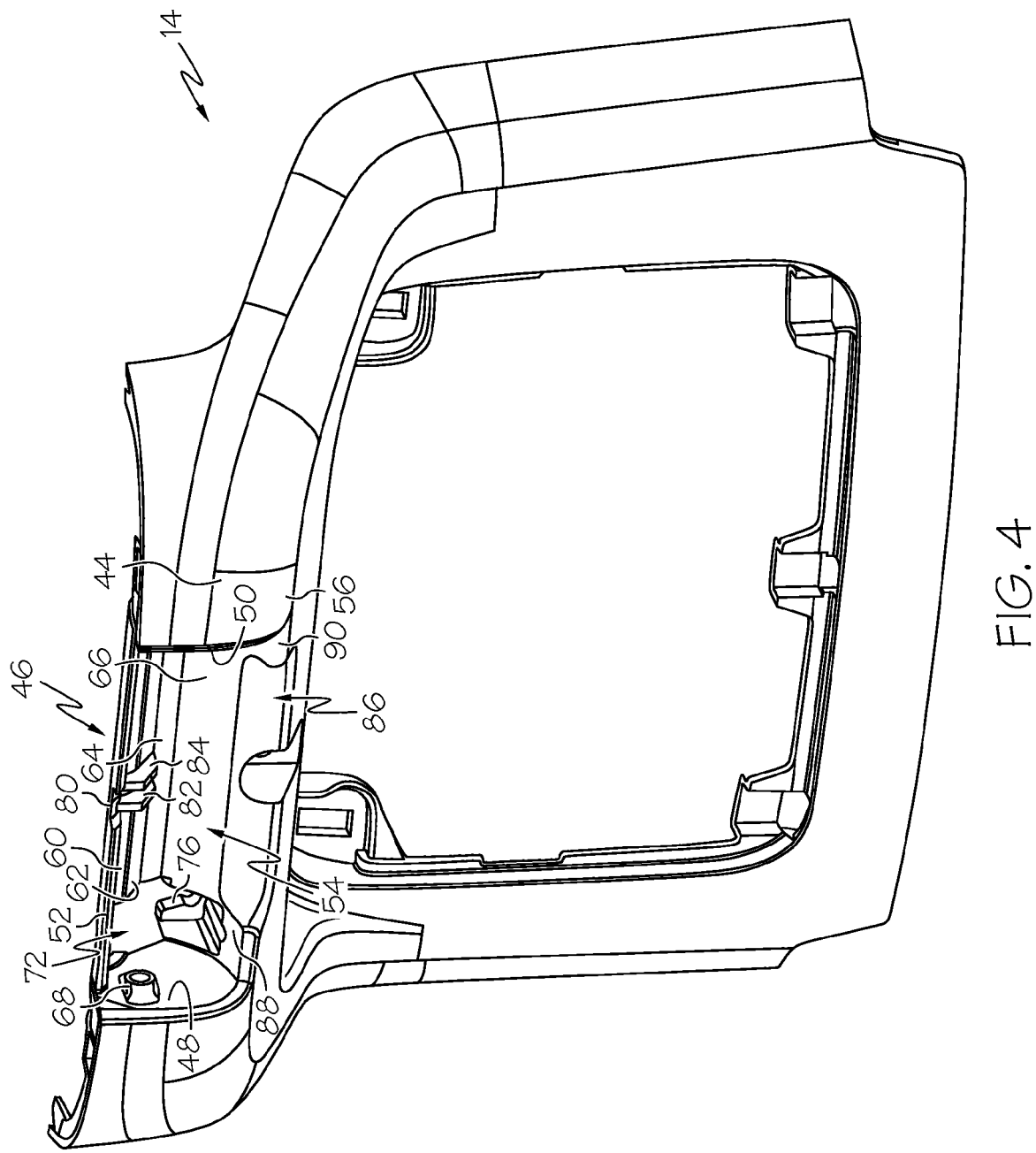
FIG. 4 is a perspective view of the rear panel of FIG. 3 according to one or more embodiments shown and described herein.

Referring to FIGS. 3 and 4, a handle receiving recess 46 is provided at the rearward facing end 44 of the panel structure 14. FIGS. 3 and 4 show the rearward facing end 44 of the panel structure 14 with the handle 36 removed for clarity. The handle receiving recess 46 includes opposing sidewalls 48 and 50, a top wall 52 and a back portion 54 that extends from the top wall 52, downwardly and rearward toward a periphery 56 of the rearward facing end 44. The back portion 54 includes surfaces 58, 60, 62 and 64, each at an angle to each other and outer surface 66 that is handle-facing and curved toward the periphery 56. As will be described in greater detail below, the back portion 54 including the outer surface 66 cooperates with the handle 36 to guide the operator's fingers to the handle 36 and to prevent the operator from locating the fingers behind the handle 36 during use.

Figure 7:
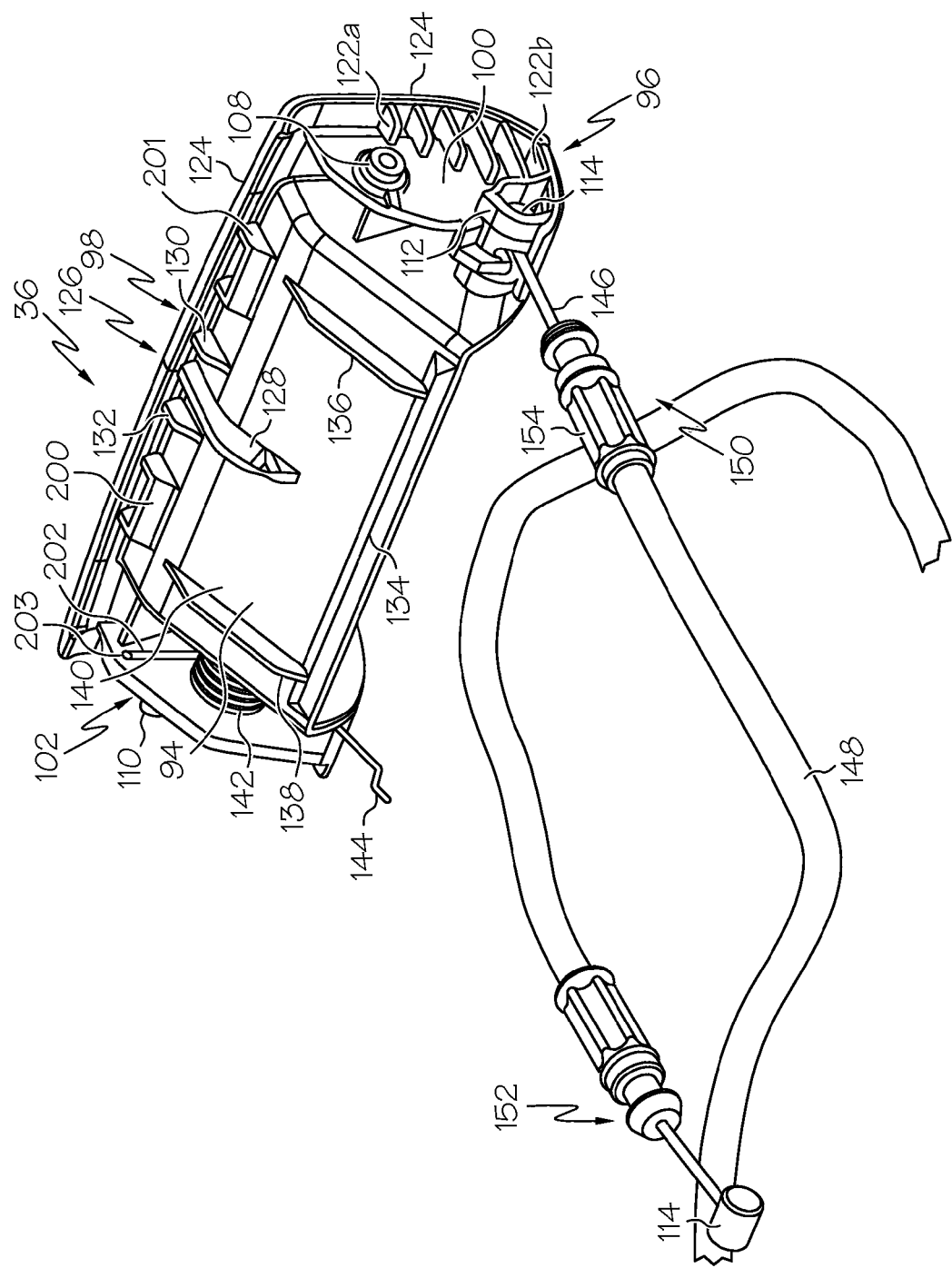
FIG. 7 is a rearward view of the handle of FIG. 5 with a latch cable connected thereto according to one or more embodiments shown and described herein.

A first pivot structure 68 extends outwardly from the sidewall 48 and a second pivot structure 70 extends outwardly from the sidewall 50. The pivot structures 68 and 70 are attachment points for the handle 36 that allow the handle 36 to pivot relative to the panel structure 14 between latched and unlatched positions. The back portion 54 has a cable receiving opening 72 at the sidewall 48 and a spring receiving opening 74 at the sidewall 50. The cable receiving opening 72 includes a notch 76 for receiving and locating a cable housing end cap 154 (FIG. 7) and the spring receiving opening 74 includes a notch 78 for receiving and locating an end of a spring 142 (FIG. 7). A guide structure 80 extends downwardly from the surfaces 58, 60 and 62. The guide structure 80 includes spaced-apart rails 82 and 84 that receive a guide member (FIG. 7) of the handle 36.

A finger guide 86 is located below the outer surface 66. The finger guide 86 is located forward of and recessed from lowermost regions 88 and 90 of the outer surface 66. The finger guide 86 provides a region between the lowermost regions 88 and 90 of the outer surface 66 where the operator can insert one or more fingers to facilitate actuation of the handle 36 (see FIG. 2). The finger guide 86 may also provide a stationary location that can be used to guide the operator's fingers toward the handle 36.

Figure 5:
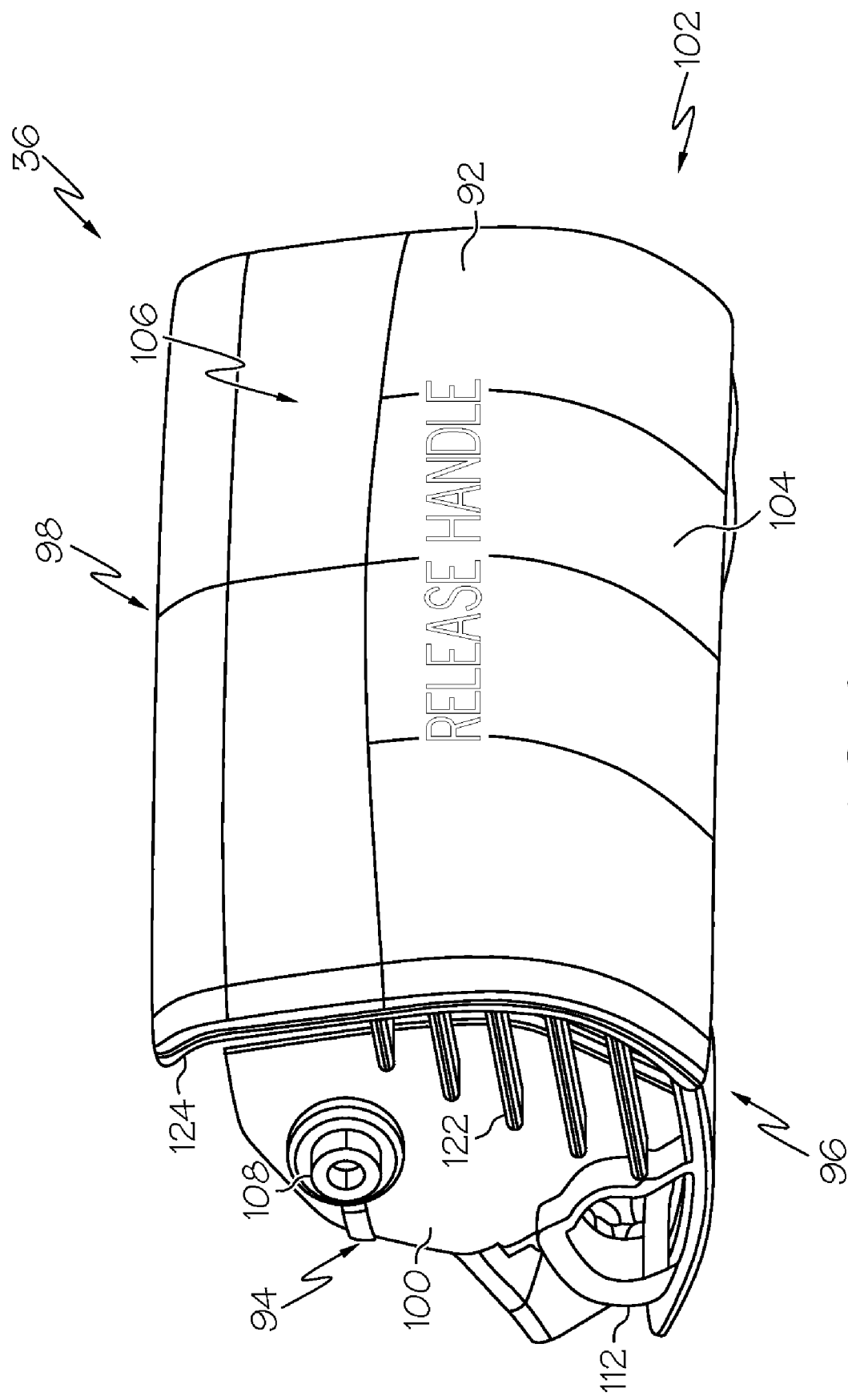
FIG. 5 is a frontward view of an embodiment of a handle for use with the console assembly of FIG. 1 according to one or more embodiments shown and described herein.
Figure 6:
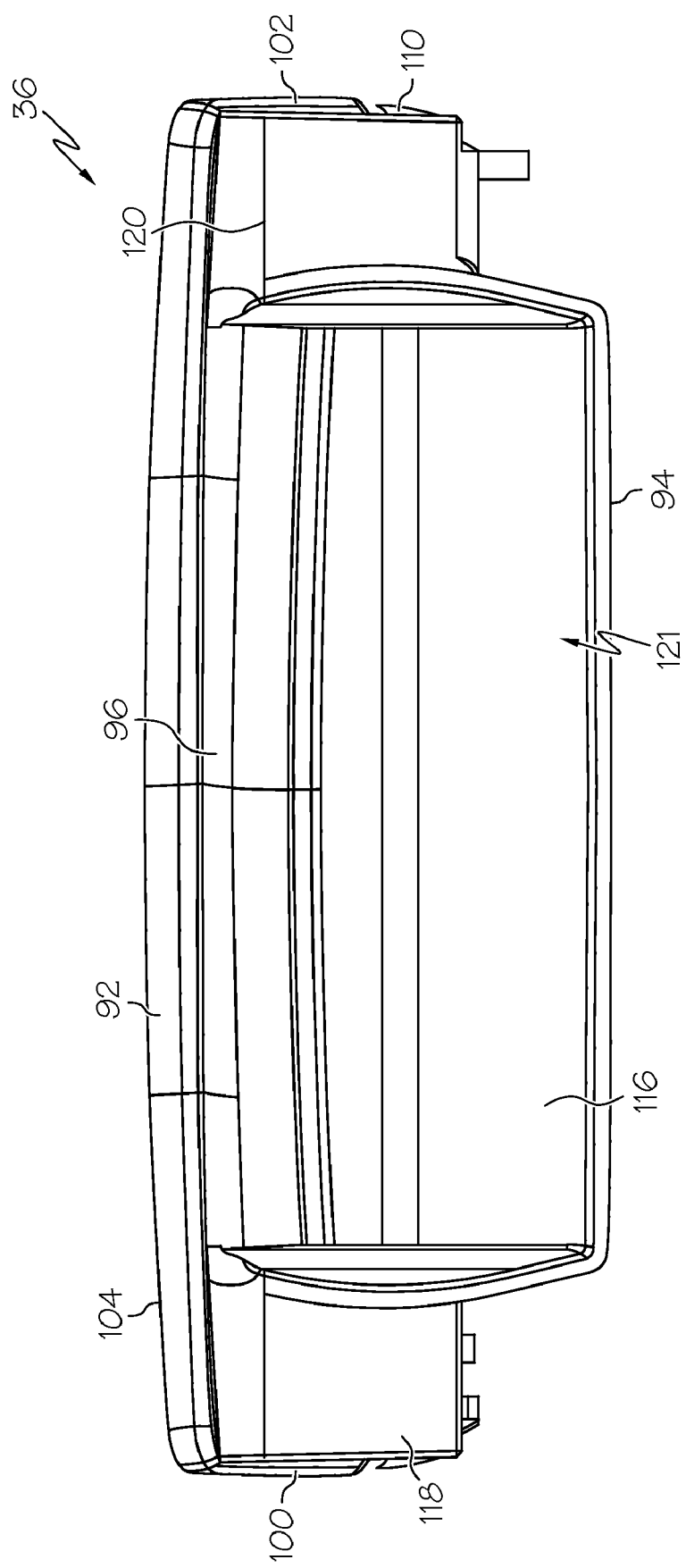
FIG. 6 is a bottom view of the handle of FIG. 5 according to one or more embodiments shown and described herein.

Referring now to FIGS. 5-7, the handle 36 is illustrated in isolation. The handle 36 generally includes a front wall 92 that, upon installation, faces rearward, a back wall 94 that faces forward, a bottom 96 that faces downward, a top 98 that faces upward and opposite sides 100 and 102 that face outward in a widthwise direction. Referring particularly to FIG. 5, the front wall 92 of the handle 36 may include a relatively broad, curved front surface 104 that is relatively planar near the top 98 and increases in curvature toward the front direction near the bottom 96. Indicia 106 may be provided on the front surface 104 for indicating a function of the handle 36. While a curved front surface 104 is illustrated, other configurations are possible, such as a more planar front surface 104.

Referring still to FIG. 5, the handle includes pivot structure 108 and 110 (see also FIG. 10) extending outward from each side 100 and 102. The pivot structures 108 and 110 are sized and located to be received by the first and second pivot structures 68 and 70 that extend outwardly from the sidewalls 48 and 50 of the handle receiving recess 46 (FIG. 3) such that the handle 36 can pivot between latched and unlatched positions. A cable connector receiving structure 112 is located at the side 100. The cable connector receiving structure 112 receives a cable connector 114 (FIG. 7) to connect a cable 146 to the handle 36.

Referring to FIG. 6, a pocket 116 is provided at the bottom 96 of the handle 36. The pocket 116 is formed between the front wall 92, the back wall 94 and the sides 100 and 102. The pocket 116 is open downward including downward facing opening 121 and is sized to receive one or more of the operator's fingers for actuation of the handle 36.

Side portions 118 and 120 of the handle 36 extend outwardly beyond the pocket 116. The side portions 118 and 120 may be used to increase a distance from the pocket to the sides 100 and 102 where one or more components are attached to the handle 36, such as a cable and a spring. Increasing the distance from the pocket 116 to the sides 100 and 102 may reduce the likelihood that an operator will come into contact with the cable and spring when actuating the handle.

Referring to FIG. 7, one or more ribs 122 are provided at the side 100. The ribs 122 extend outwardly from the side 100 toward an outer peripheral flange 124 of the front wall 92. The ribs 122 are arranged vertically, one over the other, and increase in length from the top rib 122a to the bottom rib 122b. At least some of the ribs 122 are placed rearward of the cable connector receiving structure 112 (i.e., between the cable connector receiving structure 112 and the outer peripheral flange 124 of the front wall 92). Side 102 may also include the ribs 122. The ribs 122 provide an anti-pinch feature that inhibits placement of one's fingers between the side 100 and the sidewall 48. While multiple ribs 122 are illustrated, other raised structures are possible, such as one or more domes, plateaus, etc. In some embodiments, each rib 122 has the same width and is slightly recessed from the outer peripheral flange 124 of the front wall 92. In other embodiments, the ribs 122 may have different widths and/or be flush with the outer peripheral flange 124 of the front wall 92.

A guide structure 126 is located at the top 98 of the handle 36. The guide structure 126 includes a guide rail 128 that is received between the spaced-apart rails 82 and 84 of the guide structure 80. Each spaced apart rail 82 and 84, in turn, is received between the guide rail 128 and an outer rail 130 and 132. The guide structures 80 and 126 may cooperate to provide a smooth actuation for the handle 36 by reducing side-to-side movement of the handle 36 during actuation. Stop members 136 and 138 project outwardly from rear surface 140 and are used to limit movement of the handle 36 as it moves to its latched position. Rails 130 and 132 and stop members 200 and 201 may be provided to limit the handle 36 opening amount. Reinforcement member 134 may be included to provide additional rigidity to the handle 36.

A spring 142 (e.g., a torsion spring) may be provided to apply a biasing force to the handle 36. The spring 142 may be used to bias the handle 36 toward the latched position. The spring 142 may include a leg 144 that is received within the notch 78 of the spring receiving opening 74 in the handle receiving recess 46. Opposite leg 202 may be received within a hole 203 of the handle.

Figure 8:
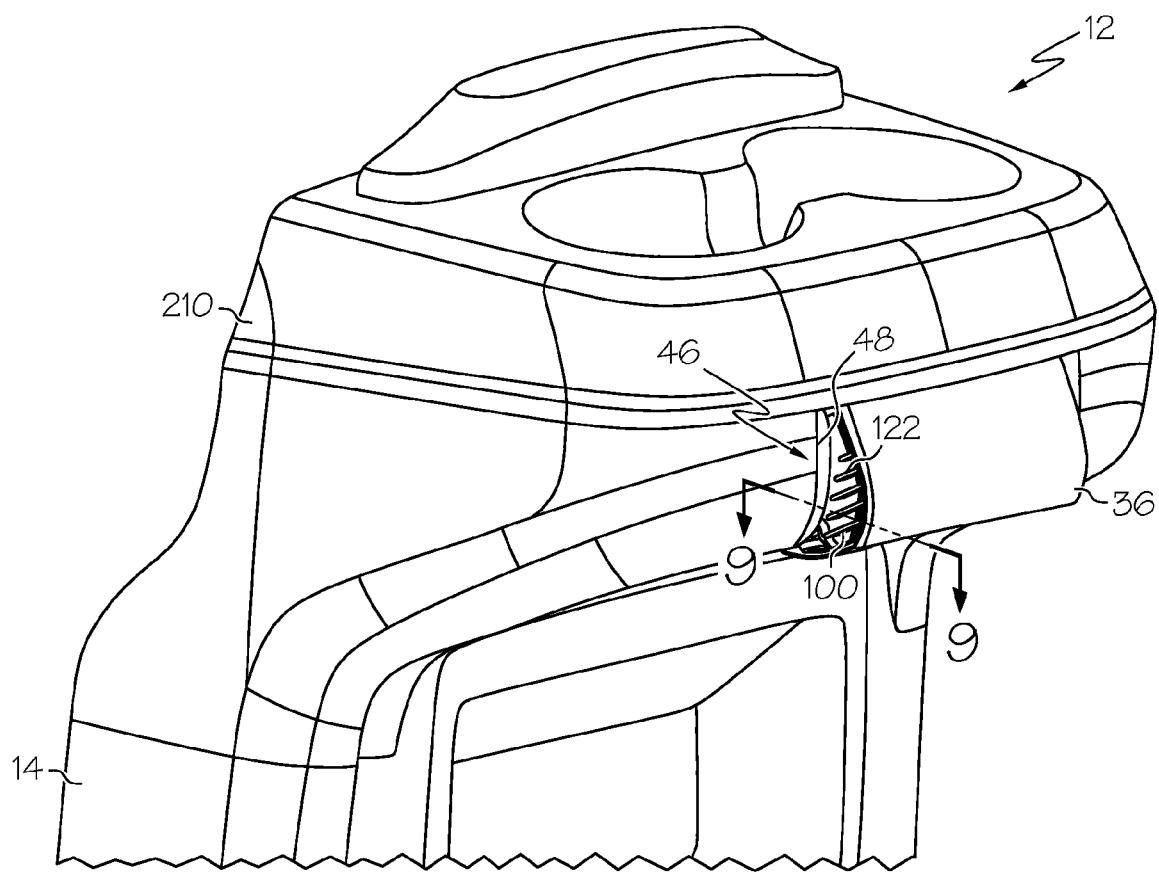
FIGS. 8-10 diagrammatically illustrate at least some of the anti-pinch features of the handle assembly according to one or more embodiments shown and described herein.
Figure 9:
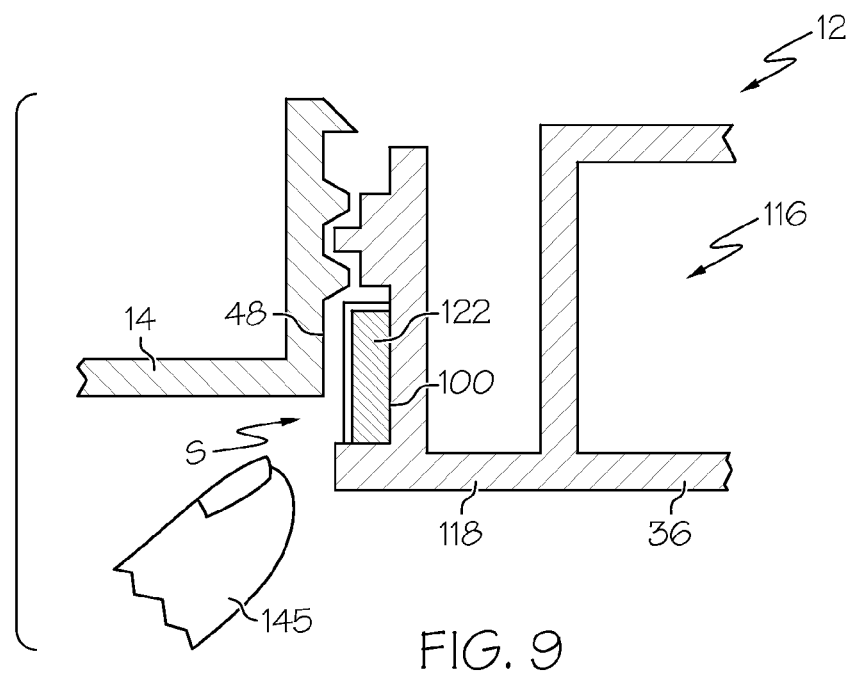
Figure 10:
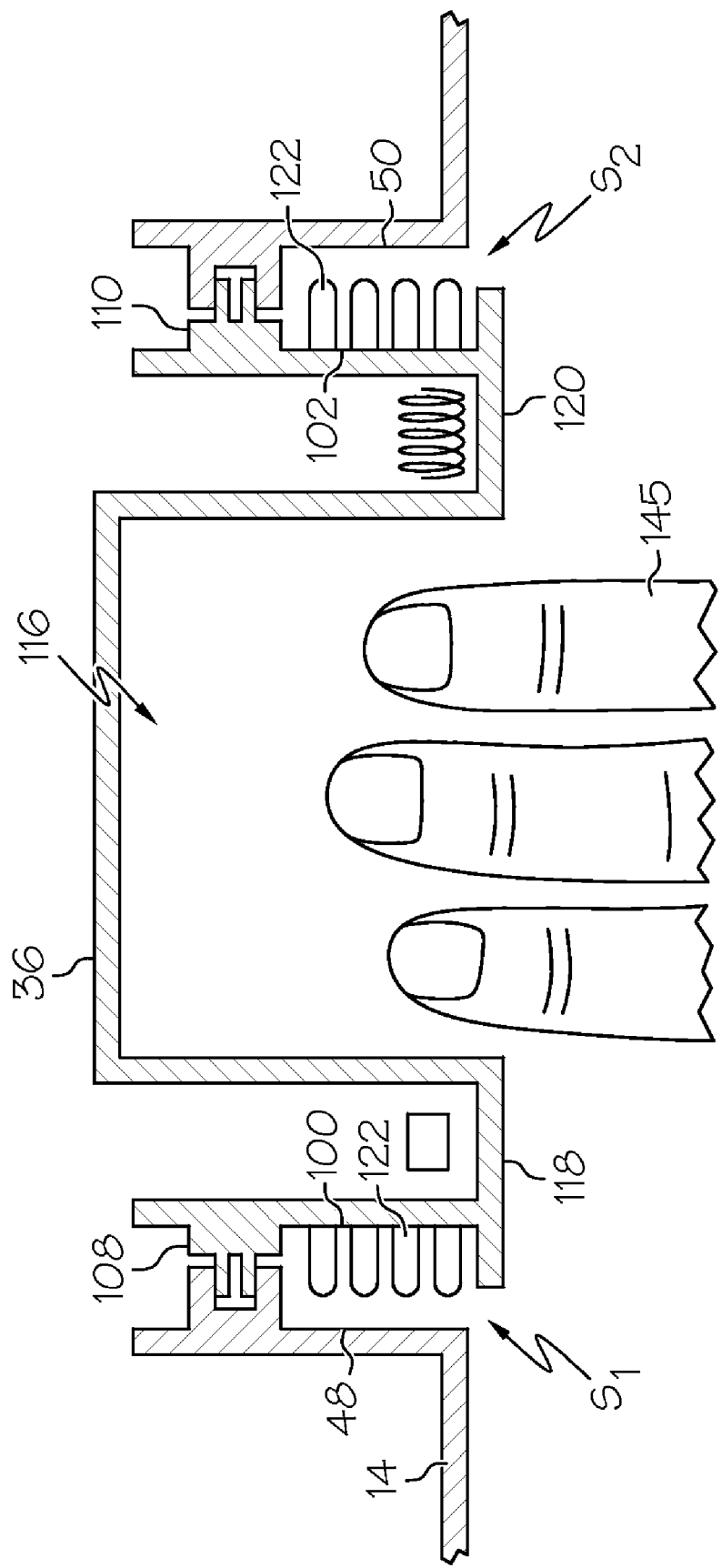

FIGS. 8-10 illustrate, diagrammatically, at least some of the anti-pinch features including the ribs 122 (FIGS. 8 and 9) and the pocket 116 with side portions 118 and 120. Referring first to FIGS. 8 and 9, the ribs 122 reduce a space S between sides 100 and 102 and the sidewalls 48 and 50 of the handle receiving recess 46. Spacing between the ribs 122 and the sidewalls 48 and 50 may be sized smaller than a width of an occupant's finger 145, even with the handle 36 in the unlatch position. Referring to FIG. 10, side portions 118 and 120 provide additional separation between the pocket 116 and the sidewalls 48 and 50. Such separation can further reduce the possibility of locating fingers 145 at the spaces $S_1$ and $S_2$ between the sides 100 and 102 and the sidewalls 48 and 50.

In one embodiment, the handle assembly 12 is used to unlatch a rear portion 210 (FIG. 8) of the console assembly 10 of the vehicle, for example, to gain access to an interior drawer (not shown). The cable 146 with an outer sheathing 148 maybe attached to the handle 36 at the cable connector receiving structure 112 which receives the connector 114 (e.g., a T-shaped connector or other suitable connector). The cable 146 may have one end 150 connected to the handle 36 and an opposite end 152 connected to a console latch assembly. The outer sheathing 148 may be connected to the panel 14 using the cable receiving opening 72 (FIGS. 3 and 4) and a mating cable housing end cap 154. The handle assembly 12 may be used to unlatch vehicle components other than the rear portion 210 of the console assembly 10 such as a hood of the vehicle, a trunk of the vehicle, a gas tank lid of the vehicle, etc.

Figure 11:
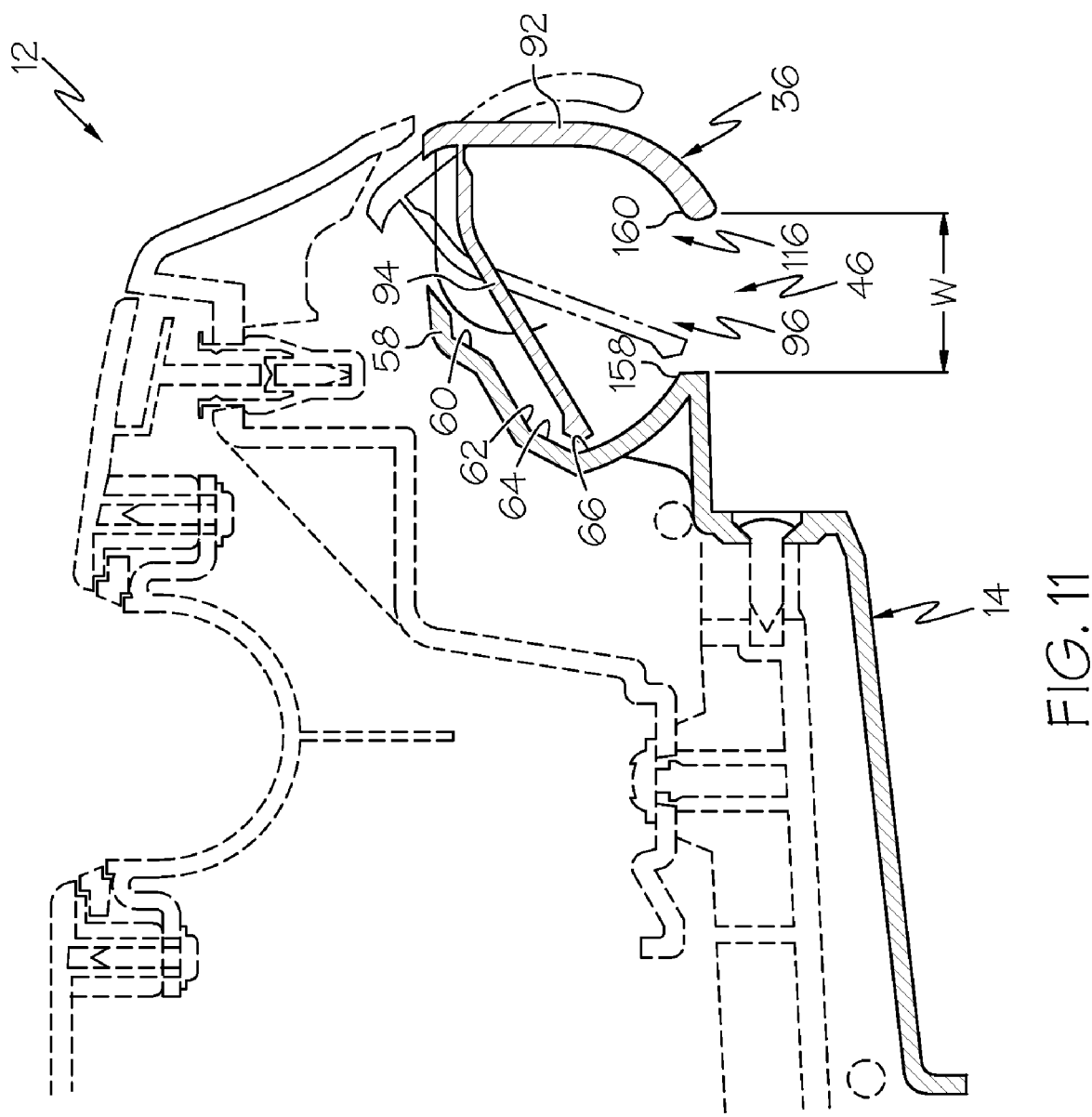
FIGS. 11-13 are diagrammatic section views illustrating operation of an embodiment of a handle assembly for use with the console assembly of FIG. 1 according to one or more embodiments shown and described herein.

Referring to FIG. 11, operation of the handle assembly 12 including the portions of the panel 14 and the handle 36 is illustrated. The handle 36 is pivotally received in the handle receiving recess 46 and includes the front wall 92, the back wall 94 and the pocket 116 that is open at the bottom 96 of the handle 36. The back portion 54 of the handle receiving recess 46 includes the surfaces 58, 60, 62 and 64 and the outer surface 66 that face the handle 36. The outer surface 66 is curved rearward toward a lower end surface 156. With the handle 36 in the latched position as illustrated by the solid lines, the surfaces 58, 60, 62 and 64 may be located behind and forward of the back wall 94 of the handle 36, while the outer surface 66 may curve beneath the pocket 116, providing a lower covering for a portion of the pocket 116. The outer surface 66 may terminate at an end 158 beneath the pocket 116 with the handle 36 in the latched position a distance W from an end 160 of the front wall 92 of the handle 36. The distance W may be selected to allow for clearance for one or more fingers to be inserted into the pocket 116 with the handle 36 in the latched position. In some embodiments, the outer surface 66 may provide a guide leading up to the pocket 116 for directing the operator's fingers toward the pocket 116.

Figure 12:
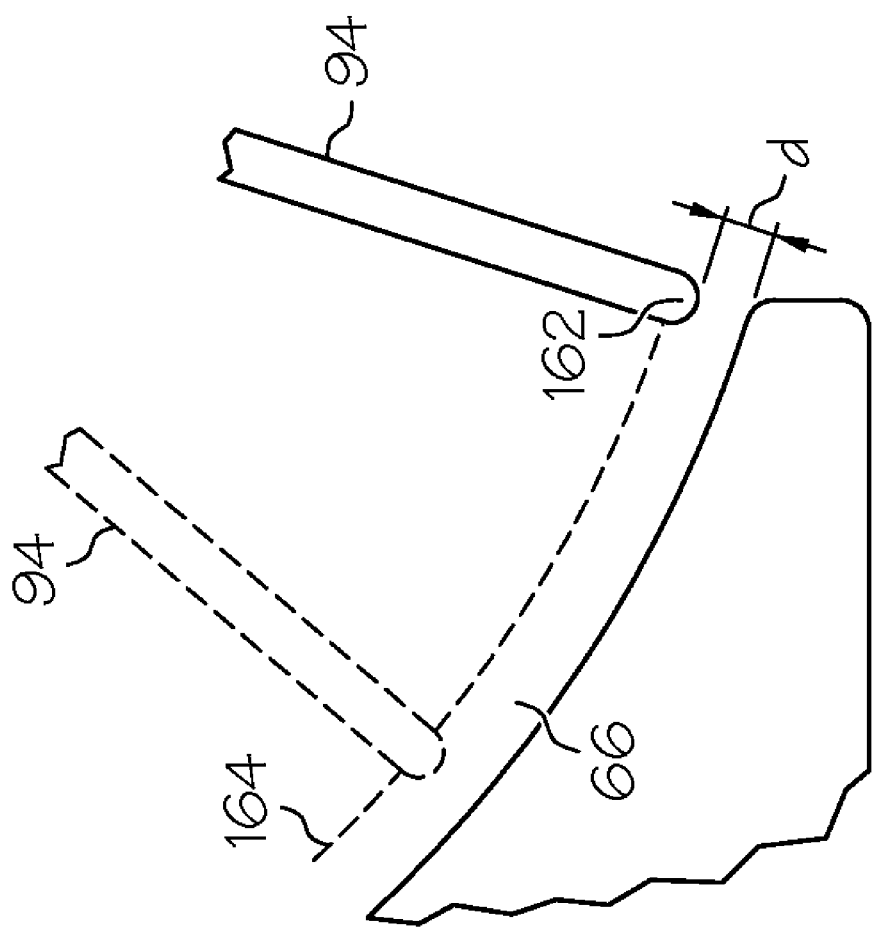

In some embodiments, referring to FIG. 12, the curvature of the outer surface 66 may be selected to maintain a maximum distance or less from a lower end 162 of the back wall 94. In one embodiment, the curvature of the outer surface 66 is about the same as the curvature of the curve (represented by dotted line 164) traced by the lower end 162 of the back wall 94 of the handle 36 as the handle 36 is moved from the latched position (represented by dashed lines in FIG. 12) to the unlatched position. The term "curvature" refers to a measure of the rate of change of direction of a curve. In some embodiments, a distance d from the lower end 162 of the back of the handle 36 to the outer surface 66 is at most about 10 mm or less such as about five mm or less, such as about three mm or less, such as about two mm or less throughout travel of the lower end 162 along the curve 164. In one embodiment, the maximum distance between the lower end 162 and the outer surface 66 is less than about a width of an operator's finger throughout travel of the lower end 162 along the curve 164. Maintaining a maximum distance or less between the outer surface 66 and the lower end 162 of the back wall 94 can inhibit locating a finger between the lower end 162 and the outer surface 66, which can reduce pinching of the finger during actuation of the handle 36.

Figure 13:
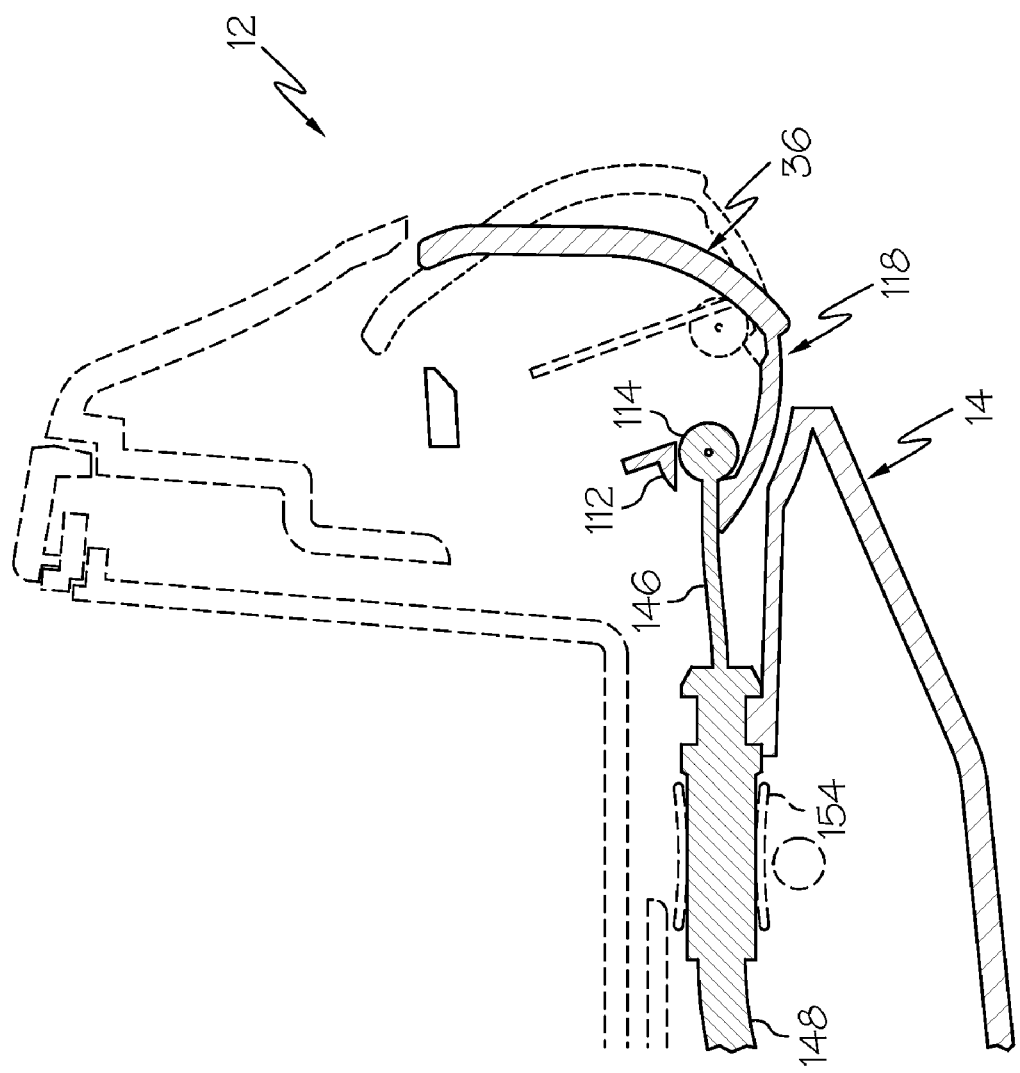

Referring to FIG. 13, as noted above, the handle 36 maybe connected to the cable 146 at the cable connector receiving structure 112 which receives the connector 114. The outer sheathing 148 may be connected to the panel 14 using the cable receiving opening 72 (FIGS. 3 and 4) and a mating cable housing end cap 154. During actuation of the handle 36, the cable 146 is pulled relative to the sheathing 14 as the handle 36 pivots from the latch position shown by the solid lines to the unlatch position shown by the dashed lines. The opposite end of the cable 146 may be connected, for example, to a console release latch of a vehicle to unlatch the rear portion 210 of the console assembly 10 when the handle 36 is placed in the unlatch position.

Figure 14:
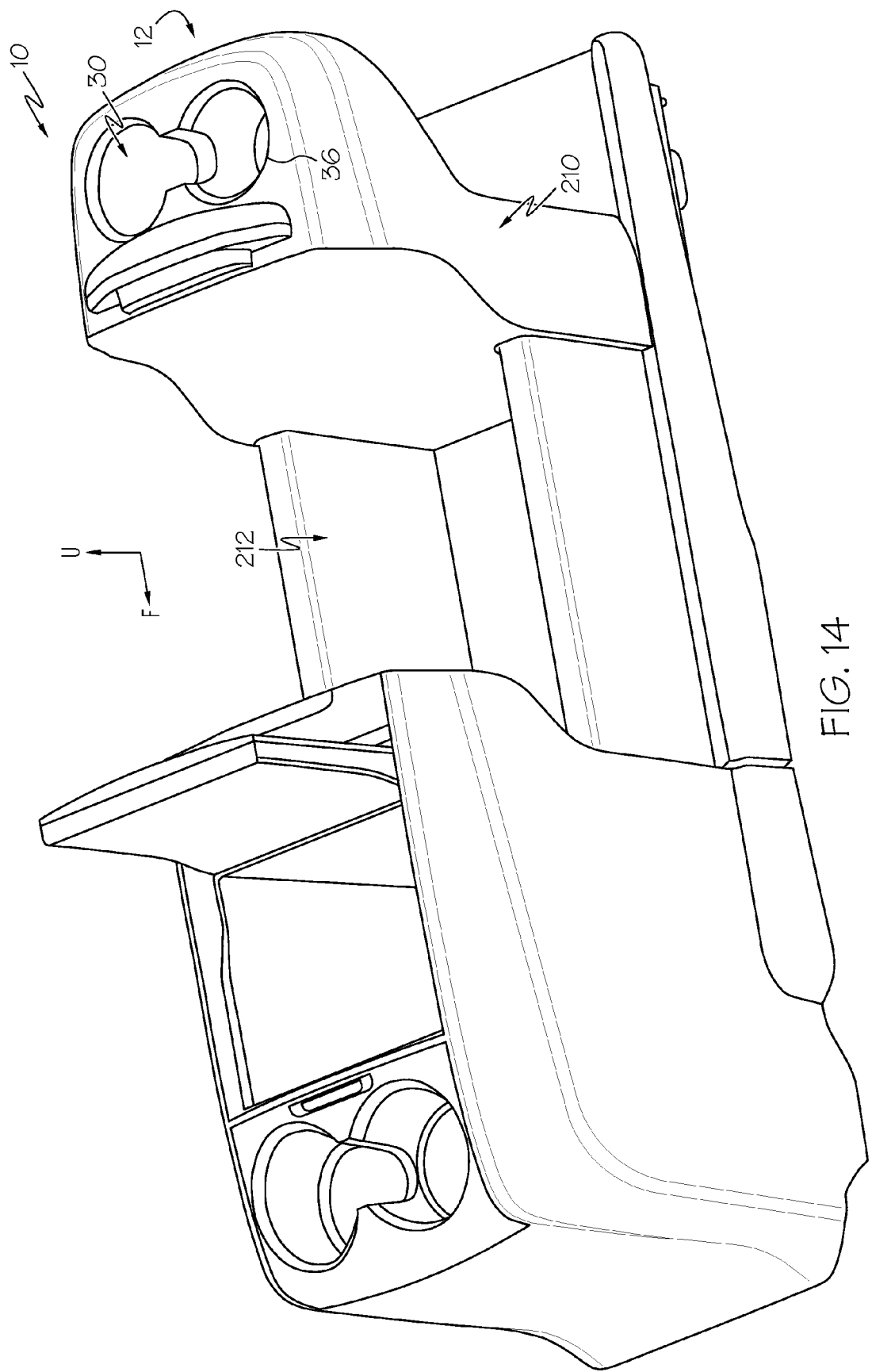
FIG. 14 is a perspective view of the console assembly of FIG. 1 with a rear portion of the console assembly in a pulled-out position according to one or more embodiments shown and described herein.

Referring now to FIG. 14, as noted above, the handle assembly 12 maybe used to unlatch the rear portion 210 of the console assembly 10. The rear portion 210, once unlatched, may be pulled toward the rear of the vehicle, for example, to move the cup holders 30 closer to the rear seats and/or to expose the drawer 212.

The above-described handle assembly 12 may include one or more anti-pinch features that can reduce the likelihood that on operator's fingers will get pinched during actuation of the handle. One such feature is providing a maximum distance between the lower end 162 of the back wall of the handle 36 and the outer surface 66 of the handle receiving recess 46. Another exemplary anti-pinch feature are ribs 122 that extend outwardly from the side 100 toward an outer peripheral flange 124 of the front wall 92 of the handle 36. The handle assembly 12 may be located at the rear of the center console assembly 10 to provide easy access for rear passengers in the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle handle assembly comprising:
a handle comprising a front wall and a back wall, the front wall and back wall defining a downwardly open pocket sized to receive one or more of an operator's fingers for a pulling operation to move the handle between latch and unlatch positions; and
a panel adjacent the handle, the panel having a portion located behind the pocket with the handle in the latch position and a portion below the pocket with the handle in the latch position, the panel having an outer surface facing the handle having a contour such that a distance from the outer surface of the panel to an end of the back wall of the handle is maintained at less than a maximum distance as the handle is moved from the latch position to the unlatch position the maximum distance selected to prevent placement of an object between the outer surface and the end of the back wall of the handle;
wherein the end of the back wall of the handle traces a curved path as the handle is moved from the latch position to the unlatch position, the outer surface being curved such that the curvature of the curved path substantially matches the curvature of the outer surface.

2. The vehicle handle assembly of claim 1, wherein the panel includes a handle receiving recess including the portion located behind the pocket and the portion below the pocket, the handle receiving recess including a first sidewall and a second sidewall opposite the first sidewall, the handle located at least partially between the first and second sidewalls.

3. The vehicle handle assembly of claim 2, wherein the handle includes
a first side that extends between the front wall and the back wall of the handle and faces the first sidewall of the handle receiving recess; and
a second side that extends between the front wall and the back wall of the handle and faces the second sidewall of the handle receiving recess,
wherein the first side includes a rib extending outwardly from the first side between the first side of the handle and the first sidewall of the handle receiving recess.

4. The vehicle handle assembly of claim 3, wherein the rib is located between the front wall and a cable connector receiving structure.

5. The vehicle handle assembly of claim 4 comprising multiple ribs that are spaced apart vertically between the front wall and the cable connector receiving structure.

6. The vehicle handle assembly of claim 2, wherein the panel includes a first pivot structure at the first sidewall and a second pivot structure at the second sidewall, the first and second pivot structures used to pivotally connect the handle to the panel.

7. The vehicle handle assembly of claim 2, wherein the handle receiving recess includes a finger guide that is recessed from a lowermost region of the outer surface.

8. A vehicle console assembly comprising:
a handle assembly located at a rear of the console comprising:
a handle comprising a front wall and a back wall, the front wall and back wall defining a downwardly open pocket sized to receive one or more of an operator's fingers for a pulling operation to move the handle between latch and unlatch positions; and
a panel adjacent the handle, the panel having an outer surface facing the handle, the outer surface being shaped to maintain a maximum distance or less from the outer surface to an end of the back wall of the handle as the handle is moved from the latch position to the unlatch position.

9. The vehicle console assembly of claim 8, wherein the handle assembly is configured for unlatching a rear portion of the vehicle console assembly to allow the rear portion to be moved.

10. The vehicle console assembly of claim 8, wherein the maximum distance is about 3 mm.

11. The vehicle console assembly of claim 8, wherein the end of the back wall of the handle traces a curved path as the handle is moved from the latch position to the unlatch position, the outer surface being curved such that the curvature of the curved path substantially matches the curvature of the outer surface.

12. The vehicle console assembly of claim 8, wherein the panel includes a handle receiving recess including the portion located behind the pocket and the portion below the pocket, the handle receiving recess including a first sidewall and a second sidewall opposite the first sidewall, the handle located at least partially between the first and second sidewalls.

13. The vehicle console assembly of claim 12, wherein the handle includes
a first side that extends between the front wall and the back wall of the handle and faces the first sidewall of the handle receiving recess; and
a second side that extends between the front wall and the back wall of the handle and faces the second sidewall of the handle receiving recess,
wherein the first side includes a rib extending outwardly from the first side between the first side of the handle and the first sidewall of the handle receiving recess.

14. The vehicle console assembly of claim 13, wherein the rib is located between the front wall and a cable connector receiving structure.

15. The vehicle console assembly of claim 14 comprising multiple ribs that are spaced apart vertically between the front wall and the cable connector receiving structure.

16. The vehicle console assembly of claim 12, wherein the handle receiving recess includes a finger guide that is recessed from a lowermost region of the outer surface.

17. A vehicle console assembly comprising:
a housing comprising one or more panels including a rear panel; and
a handle comprising a front wall and a back wall, the front wall and back wall defining a downwardly open pocket sized to receive one or more of an operator's fingers for a pulling operation to move the handle between latch and unlatch positions relative to the rear panel;
wherein an end of the back wall of the handle traces a curved path as the handle is moved from the latch position to the unlatch position, the panel being curved such that the curvature of the panel below the end of the back wall follows the curvature of the curved path to control a distance between the end of the back wall and the panel as the handle is moved.

18. The vehicle console assembly of claim 17, wherein the curvature of the panel below the end of the back wall follows the curvature of the curved path to maintain spacing between the end of the back wall and the panel at or below a preselected distance as the handle is moved.

19. The vehicle console assembly of claim 17, wherein the handle includes
- a first side that extends between the front wall and the back wall of the handle and faces a first sidewall of a handle receiving recess of the rear panel;
- a second side that extends between the front wall and the back wall of the handle and faces a second sidewall of the handle receiving recess of the rear panel; and
- a rib extending outwardly from the first side between the first side of the handle and the first sidewall of the handle receiving recess, the rib being located between the front wall and a cable connector receiving structure of the handle connecting the handle to a cable connector.

\* \* \* \* \*